Dec. 27, 1949     C. M. THACKER     2,492,719
PREPARATION OF CARBON DISULFIDE
Filed June 26, 1943
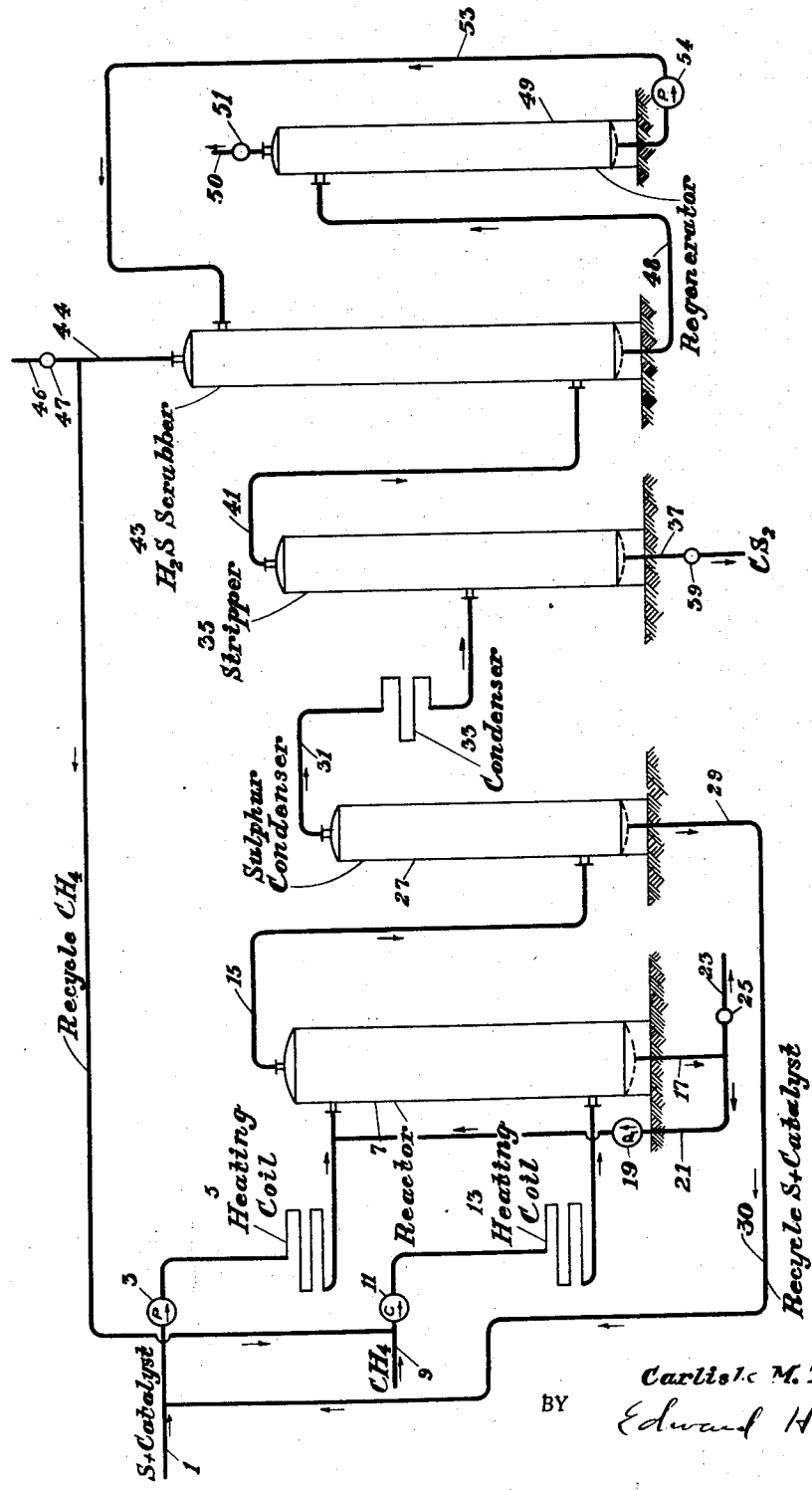
INVENTOR.
Carlisle M. Thacker
BY Edward H. Lang
ATTORNEY Patented Dec. 27, 1949

2,492,719

UNITED STATES PATENT OFFICE 2,492,719

PREPARATION OF CARBON DISULFIDE

Carlisle M. Thacker, Highland Park, Ill., assignor to The Pure Oil Company, Chicago, Ill., a corporation of Ohio Application June 26, 1943, Serial No. 492,358

14 Claims. (Cl. 23—206)

This invention relates to a method for preparing carbon disulfide by reaction of sulfur with hydrocarbons, and is more particularly concerned with a method for reacting liquid sulfur with hydrocarbon gases in the presence of a catalyst to form carbon disulfide. This application is related to Patent No. 2,330,934.

The preparation of carbon disulfide by reaction of sulfur and hydrocarbon liquids or gases is well known. It has already been proposed to contact sulfur in vapor form with the hydrocarbons in the presence or absence of catalysts.

Processes for reacting hydrocarbons with sulfur have also been proposed at temperatures sufficiently low so that sulfur would be in the liquid state. However, the conditions of operation have been such that substantially no reaction between sulfur and saturated hydrocarbon gases such as methane, ethane and propane would occur.

Hydrocarbon gas is contacted with sulfur at a temperature above its normal vaporizing temperature, but under sufficient pressure to maintain the sulfur in the liquid phase. In my preferred method for carrying out the reaction, liquid sulfur is mixed with an appropriate amount of catalyst capable of promoting the formation of carbon disulfide. As catalyst I prefer finely comminuted silica gel, fuller's earth, active bauxite, activated alumina and other catalytic materials of the clay type, either alone or impregnated with one or more metal compounds such as the oxides or sulfides of the metals of the 5th, 6th, 7th and 8th groups of the periodic table. Although the amount of catalyst mixed with the sulfur is not critical, I prefer to use from 2 to 20% by weight of catalyst based on the sulfur since, when present in these amounts, the catalyst effectively catalyzes the reaction. Sulfur or sulfur-catalyst mixture enters the system through line 1 and is forced by pump 3 through heating coil 5 where its temperature may be raised to approximately 450° to 750° C. The temperature of the sulfur or sulfur-catalyst mixture may be raised in coil 5 to approximately the desired reaction temperature or to a temperature somewhat in excess of reaction temperature. The pressure at which the sulfur or sulfur-catalyst mixture is forced by pump 3 through the heating coil will depend upon the temperature to which it is heated, but in no case should it be less than the vapor pressure of the sulfur at the particular temperature, and preferably should be somewhat in excess of the vapor pressure. Thus, where the reaction is carried out at a temperature of about 450° C., a pressure in excess of 20 pounds per square inch should be maintained in the heating coil and reactor, whereas if the temperature of the action is in the neighborhood of 750° C., the pressure will be approximately 400 pounds per square inch or greater.

From the heating coil 5 the sulfur or sulfur-catalyst mixture passes into the upper portion of a reactor 7 and flows downwardly therethrough over suitable contact surfaces such as Raschig rings or baffles. The reactor should be provided with heating means to maintain the reactants at desired reaction temperature. The reaction is endothermic in the lower reaction temperature range and therefore it may be necessary to provide additional heat in the reactor. Methane or other hydrocarbon gas which it is desired to convert to carbon disulfide enters the system through line 9 and is compressed by compressor 11 to a pressure slightly above that maintained in reactor 7. The compressed gas is forced through heating coil 13 where it is preferably heater to a temperature sufficiently high to assist in maintaining the temperature in reactor 7 at the desired reaction temperature, and then charged into the lower portion of reactor 7. Although the gas is preferably heated to a temperature slightly above desired reaction temperature, it may be preheated to a lower temperature in order to avoid substantial cracking thereof. The gas passes upwardly in countercurrent contact with the down-flowing liquid sulfur or sulfur-catalyst mixture. In the presence of the catalyst the gas and sulfur quickly react to form carbon disulfide. The ratio of sulfur to hydrocarbon gas charged to the reactor should be such as to provide sufficient sulfur to react with all methane to form carbon disulfide and hydrogen sulfide. Thus, in the case of methane, the ratio of sulfur to methane should be at least 4 atoms of sulfur to 1 molecule of methane. I prefer, however, to maintain a much higher ratio of sulfur to methane than that which is stoichiometrically required. The reactor should be of sufficient size to permit a contact time between hydrocarbon gas and sulfur of at least 0.5 of a second. At 700° C. the preferred contact time is approximately 0.5 second. However a longer contact time may be used as well as a shorter time, but where shorter contact times are used, some sacrifice in $CS_2$ yield per pass will result. The lower the reaction temperature the longer the contact time required to obtain a given yield per pass.

Carbon disulfide, together with hydrogen sulfide and small amounts of sulfur and unreacted methane or other gas, leave the top of the reactor through line 15. Liquid sulfur containing suspended catalyst may be withdrawn from the bottom of the reactor through line 17 and recycled by means of pump 19 through line 21 to reactor 7 for re-use in the process. Catalyst may be withdrawn from the system from time to time through line 23 controlled by valve 25 and replaced by fresh catalyst charged, together with the sulfur, through line 1.

My process contemplates charging fresh catalysts continuously or intermittently and withdrawing spent catalyst continuously or intermittently from the system. In cases where the catalyst has a long life it is not necessary to continuously charge and withdraw catalyst from the system. Thus, the process can be operated in a continuous manner without recycle of sulfur and catalyst from the reactor by charging sulfur catalyst to the system at the beginning of the reaction until sufficient catalyst has accumulated in the reactor, and then continuing to charge sulfur in amounts equal to that converted to carbon disulfide without further addition of catalyst until such time as it is found necessary to withdraw spent catalyst. I prefer, however, to utilize the cyclic circulation of sulfur and catalyst because of the better contact between reactant and catalyst and the improved yields which are possible, and to intermittently introduce fresh catalyst with liquid sulfur to replenish spent catalyst which may be withdrawn.

Vapors and gases from line 15 pass through sulfur condenser 27 where the temperature of the vapors is lowered sufficiently to condense the sulfur vapor in the gas stream. The temperature to which it is necessary to cool the vapor-gas mixture will depend on the pressure maintained in the sulfur condenser. Temperature is maintained sufficiently high to prevent condensation of the carbon disulfide and to maintain the sulfur in liquid condition. The liquid sulfur is withdrawn from the bottom of the sulfur condenser through line 29 and recycled through line 30 to line 1. The uncondensed vapors and gases are withdrawn from sulfur condenser 27 through line 31 and are cooled in condenser 33 to a temperature sufficient to condense the carbon disulfide to liquid form. The resulting gas and liquid passes from condenser 33 to the lower part of stripper 35 where the liquid carbon disulfide is separated from the uncondensed gases and withdrawn from the bottom thereof through line 37 and valve 39. The uncondensed gases leave the top of the stripper through line 41 and pass to scrubber 43 where they are scrubbed with a reagent such as diethanolamine capable of removing hydrogen sulfide from the gases. The remaining gases are taken from the top of the scrubber through line 44 and may be recycled to line 9 or eliminated from the system through line 46 and valve 47. The scrubbing solution is withdrawn from scrubber 43 through line 48 and charged to regenerator 49 where the scrubbing liquid is relieved of its hydrogen content. The hydrogen sulfide is withdrawn from the top of the regenerator through line 50 and valve 51. The regenerated liquid is recycled from the bottom of regenerator 49 through line 53 to the top of scrubber 43 by means of pump 54.

Although pressure on the system may be relieved at any point subsequent to the reactor, I prefer to maintain the entire system under pressure.

Although no provision is shown in the drawing for recovering sulfur from hydrogen sulfide withdrawn from the system through line 50 it will be understood that the hydrogen sulfide can be converted into sulfur in any known manner and be recycled to line 1, or the hydrogen sulfide can be entirely eliminated from the system and be utilized for some other purpose.

Although I have described my invention with respect to the use of methane or methane-rich gas in the preparation of carbon disulfide, other hydrocarbon gases such as ethane, propane and butane or mixtures thereof or with methane, as well as unsaturated gases and admixtures thereof with any of the aforesaid saturated hydrocarbon gases may be used as charging stock for the process.

It is claimed:

1. The process of preparing carbon disulfide which comprises cyclically circulating a suspension of catalyst in molten sulfur through a heating zone and a reaction zone, heating the sulfur and catalyst to a temperature above the normal boiling point of sulfur, intimately contacting the heated sulfur and catalyst with hydrocarbon gas in said reaction zone and maintaining said heating and reaction zones under sufficient pressure to maintain the sulfur in liquid phase.

2. Method in accordance with claim 1 in which the sulfur and catalyst are heated to a temperature of approximately 500° to 700° C.

3. Method in accordance with claim 1 in which the hydrocarbon gas is heated to approximately reaction temperature and then brought into counter-current contact with the sulfur and catalyst.

4. Process in accordance with claim 1 in which the catalyst is silica gel.

5. Process in accordance with claim 1 in which the catalyst is fuller's earth.

6. Process in accordance with claim 1 in which the catalyst is an activated alumina.

7. The process for converting gas rich in methane into carbon disulfide which comprises maintaining a body of sulfur in a reaction chamber at a temperature above 450° C., but below 700° C. under sufficient pressure to maintain the sulfur in liquid phase and prevent boiling thereof at reaction temperature, suspending in the liquid sulfur a catalyst selected from the group consisting of silica gel, bauxite, activated alumina, fuller's earth and catalytic clays, intimately contacting said gas with said suspension of catalyst in sulfur by bringing them into counter-current contact with each other, continuously cycling the sulfur-catalyst mixture to and from the reaction chamber and recovering carbon disulfide from the resulting gas-vapor mixture.

8. The process of preparing carbon disulfide which comprises heating sulfur to a temperature of 500° C. to 700° C. under sufficient pressure to maintain the sulfur in liquid phase and prevent boiling thereof at reaction temperature, and intimately contacting the heated sulfur with hydrocarbon gas by passing the gas upwardly over contact surfaces in contact with downflowing liquid sulfur in the presence of a catalyst capable of promoting the formation of carbon disulfide.

9. Process in accordance with claim 8 in which the catalyst is suspended in the molten sulfur.

10. Process in accordance with claim 8 in which the catalyst is selected from the group consisting of silica gel, bauxite, activated alumina, fuller's earth and catalytic clays.

11. Method in accordance with claim 8 in which the gas is heated to approximately reaction temperature before contacting it with the sulfur and catalyst.

12. Process in accordance with claim 8 in which the catalyst is silica gel.

13. Process in accordance with claim 8 in which the catalyst is fuller's earth.

14. Process in accordance with claim 8 in which the catalyst is an activated alumina.

CARLISLE M. THACKER.

REFERENCES CITED

The following references are of record in the file of this patent:

UNITED STATES PATENTS

| Number | Name | Date |
| --- | --- | --- |
| 1,735,409 | Pier | Nov. 12, 1929 |
| 1,981,161 | Bodenstein | Nov. 20, 1934 |
| 2,187,393 | De Simo | Jan. 16, 1940 |
| 2,237,339 | De Florez | Apr. 8, 1941 |
| 2,259,901 | Matheson | Oct. 21, 1941 |